United States Patent
Lee et al.

(10) Patent No.: US 9,151,339 B2
(45) Date of Patent: *Oct. 6, 2015

(54) LOCKING DISCONNECT CLUTCH

(71) Applicant: Schaeffler Technologies GmbH & Co. KG, Herzogenaurach (DE)

(72) Inventors: Brian Lee, York, SC (US); Carsten Ohr, Charlotte, NC (US); Philip George, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/170,765

(22) Filed: Feb. 3, 2014

(65) Prior Publication Data

US 2014/0231208 A1 Aug. 21, 2014

Related U.S. Application Data

(60) Provisional application No. 61/765,721, filed on Feb. 16, 2013.

(51) Int. Cl.
| | | |
|---|---|---|
| *F16D 47/02* | (2006.01) | |
| *F16D 21/00* | (2006.01) | |
| *F16D 13/16* | (2006.01) | |
| *F16D 15/00* | (2006.01) | |
| *F16D 25/08* | (2006.01) | |
| *F16D 23/12* | (2006.01) | |

(52) U.S. Cl.
CPC ............... *F16D 21/00* (2013.01); *F16D 13/16* (2013.01); *F16D 15/00* (2013.01); *F16D 25/08* (2013.01); *F16D 2023/123* (2013.01)

(58) Field of Classification Search
CPC ......... F16D 21/00; F16D 25/08; F16D 13/16; F16D 15/00; F16D 2023/123; F16D 19/00; F16D 13/52
USPC ........... 192/48.5, 70.11, 48.6, 30 R, 31, 41 R, 192/43.1, 48.1, 200, 114 R, 38, 44, 47; 180/247, 248, 249, 251; 475/150, 204, 475/200, 201, 223, 225, 249
See application file for complete search history.

(56) References Cited

U.S. PATENT DOCUMENTS

| | | | | |
|---|---|---|---|---|
| 3,446,323 | A * | 5/1969 | Hilpert | 192/70.11 |
| 4,186,827 | A * | 2/1980 | Spanke | 192/18 A |
| 4,650,007 | A * | 3/1987 | Fujita et al. | 173/178 |
| 4,753,330 | A * | 6/1988 | Ohzono et al. | 192/48.4 |
| 5,099,972 | A * | 3/1992 | Ouchi | 192/45.02 |
| 5,638,929 | A * | 6/1997 | Park | 192/44 |

(Continued)

*Primary Examiner* — David J Hlavka
(74) *Attorney, Agent, or Firm* — Kevin L. Parks

(57) ABSTRACT

A disconnect clutch includes a hub, a carrier, a wedge plate, a friction plate, a pressure plate, and a pin. The hub has a radially outer surface with a ramp and the carrier has a radially inner surface. The wedge plate is disposed radially between the hub and the carrier. It has a radially inner surface with a ramp, proximate and complementary to the hub outer surface, a radially outer surface proximate the carrier inner surface, and a split extending from the radially inner surface to the radially outer surface. The friction plate is drivingly connected to the carrier. The pressure plate is arranged for frictionally engaging the wedge plate with the at least one friction plate. The pin is rotationally fixed and radially or axially displaceable with respect to the hub, and arranged for limiting rotation of the at least one wedge plate relative to the hub.

12 Claims, 12 Drawing Sheets

(56) References Cited

U.S. PATENT DOCUMENTS

| | | | |
|---|---|---|---|
| 5,732,807 A * | 3/1998 | Itoh et al. | 192/38 |
| 6,015,035 A * | 1/2000 | Mizukami | 192/107 C |
| 6,290,044 B1 * | 9/2001 | Burgman et al. | 192/46 |
| 6,520,885 B2 | 2/2003 | Gassmann et al. | |
| 7,150,694 B2 | 12/2006 | Mizon et al. | |
| 7,168,545 B2 * | 1/2007 | Ochsenknecht et al. | 192/109 F |
| 7,175,557 B2 * | 2/2007 | Kirkwood et al. | 475/150 |
| 7,309,301 B2 | 12/2007 | Janson et al. | |
| 8,272,488 B2 * | 9/2012 | Eisengruber et al. | 192/46 |
| 8,286,772 B2 * | 10/2012 | Eisengruber | 192/43.1 |
| 2002/0027055 A1 * | 3/2002 | Le-Calve et al. | 192/46 |
| 2009/0205918 A1 * | 8/2009 | Samie et al. | 192/43.1 |
| 2009/0266667 A1 * | 10/2009 | Samie et al. | 192/43.1 |
| 2010/0252384 A1 * | 10/2010 | Eisengruber | 192/35 |
| 2011/0192698 A1 * | 8/2011 | Shimokasa et al. | 192/70.11 |
| 2012/0145508 A1 * | 6/2012 | Dziurda et al. | 192/70.11 |
| 2012/0181136 A1 * | 7/2012 | Dziurda et al. | 192/70.2 |
| 2013/0056321 A1 * | 3/2013 | Fujii et al. | 192/48.1 |
| 2013/0248317 A1 | 9/2013 | Lee | |

* cited by examiner

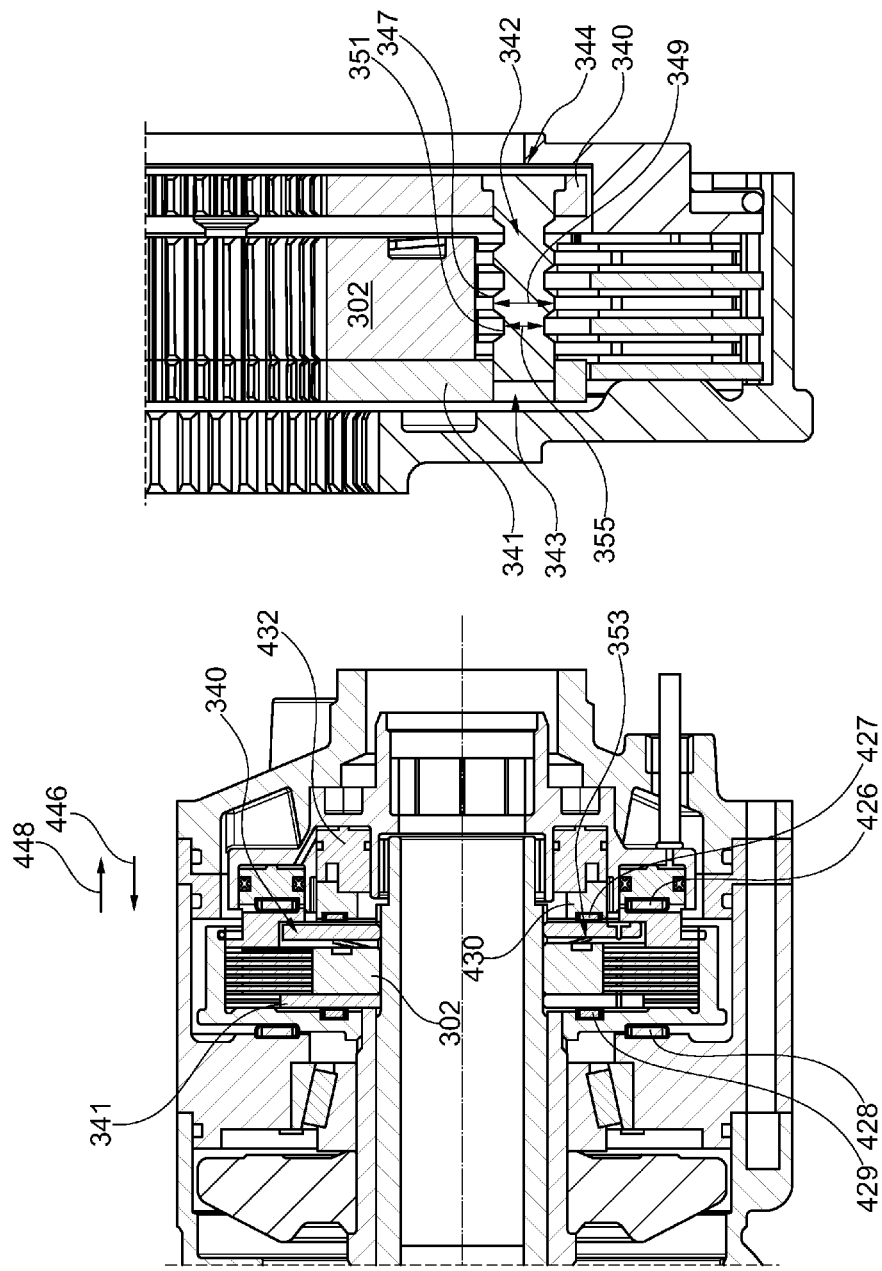

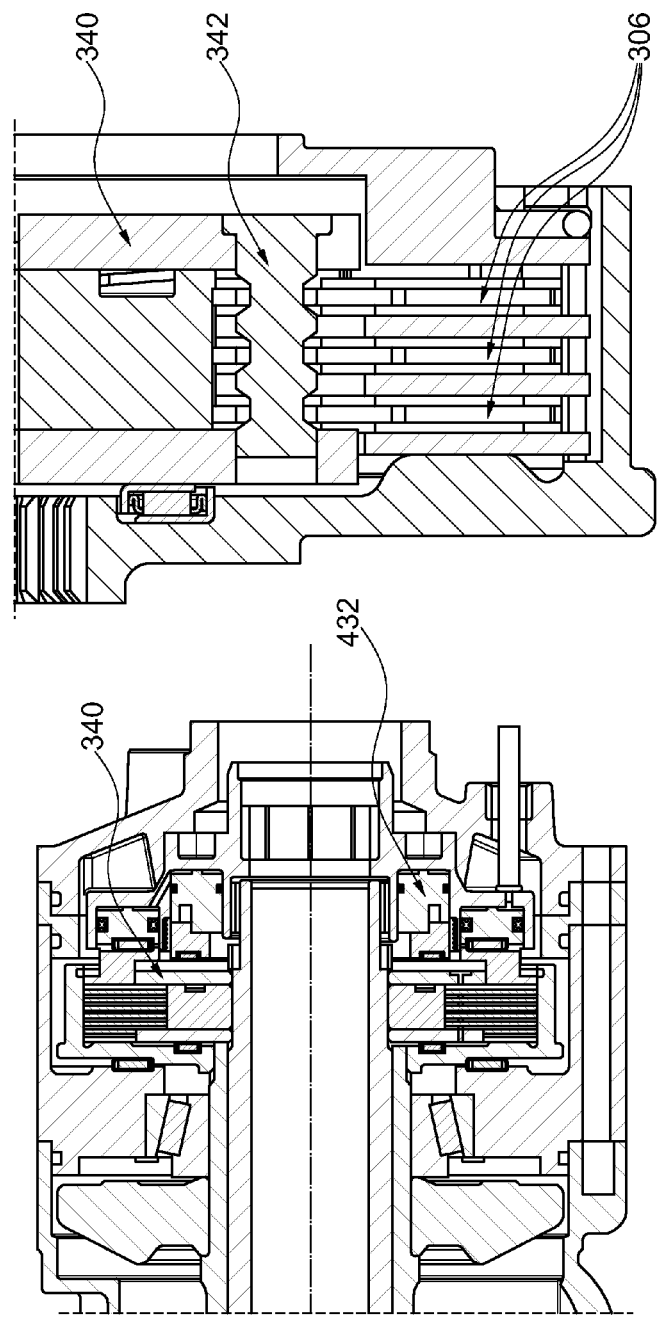

LOCKING DISCONNECT CLUTCH

FIELD

The invention relates generally to a disconnect clutch, and more specifically to a synchronizing disconnect clutch that can be locked after engagement.

BACKGROUND

Disconnect clutches are known. One example of a clutch in a power transfer unit (PTU) of an all-wheel drive vehicle is shown in U.S. Pat. No. 7,150,694. Other examples include U.S. Pat. No. 7,150,694 and U.S. Pat. No. 7,309,301 showing transfer clutches in a differential to control torque to a secondary drive shaft. U.S. Pat. No. 6,520,885 is an example of using a roller or dog clutch to control torque to a secondary drive shaft. However, a vehicle must be at a stand still to use of such clutches.

BRIEF SUMMARY

Example aspects broadly comprise a disconnect clutch including a hub, a carrier, a wedge plate, a friction plate, a pressure plate, and a pin. The hub has a radially outer surface with a ramp and the carrier has a radially inner surface. The wedge plate is disposed radially between the hub and the carrier. It has a radially inner surface with a ramp, proximate and complementary to the hub outer surface, a radially outer surface proximate the carrier inner surface, and a split extending from the radially inner surface to the radially outer surface. The friction plate is drivingly connected to the carrier. The pressure plate is arranged for frictionally engaging the wedge plate with the at least one friction plate. The pin is rotationally fixed and radially or axially displaceable with respect to the hub, and arranged for limiting rotation of the at least one wedge plate relative to the hub.

In an example embodiment, the hub includes a first spline arranged for driving connection to a first shaft and the carrier includes a second spline arranged for driving connection with a second shaft. In some example embodiments, the disconnect clutch includes a cam plate that is rotationally displaceable relative to the hub and includes a first slot. The wedge plate includes a second radial slot and the hub includes a third radial slot. The pin is disposed in the third radial slot, is arranged to radially engage the second radial slot, and includes an axial protrusion disposed in the first slot. In an example embodiment, the disconnect clutch includes a spring urging the pin in a radially outward direction to engage the second radial slot.

Other example aspects broadly comprise a power transfer unit including a disconnect clutch, a housing, a first piston disposed in the housing and arranged for axially displacing the pressure plate, and a clamping plate, rotationally fixed relative the housing and arranged for frictional engagement with the cam plate. In an example embodiment, the power transfer unit includes a second piston disposed in the housing and arranged for frictionally engaging the clamping plate with the cam plate. In some example embodiments, the pin includes a protrusion disposed in the cam plate slot, a radius of the cam plate slot varies in a circumferential direction, and the pin is arranged to be radially displaced when the cam plate rotates relative to the hub. In an example embodiment, the wedge plate includes a slot and the pin engages the wedge plate slot when the pin is displaced radially outward.

In some example embodiments, the wedge plate comprises a slot or hole and the pin is disposed in the slot or hole. In an example embodiment, the pin includes a first cylindrical portion with a first diameter arranged for a tight fit with the wedge plate slot or hole, and a second cylindrical portion, axially offset from the first cylindrical portion, with a second diameter less than the first diameter and arranged for a loose fit with the wedge plate slot or hole. In some example embodiments, the disconnect clutch includes a first pin plate with an aperture. The pin is fixed in the first pin plate aperture. In some example embodiments, the disconnect clutch includes a second pin plate with an aperture. The pin is axially slidable in the second pin plate aperture. In an example embodiment, the first and/or second pin plate is arranged to be rotationally fixed relative to the hub.

Other example aspects broadly comprise a power transfer unit with a disconnect clutch, a first piston for axially displacing the pressure plate in a first direction, and a second piston for axially displacing the first pin plate in the first direction. In an example embodiment, the disconnect clutch has an elastic element disposed between the hub and the first pin plate for axially displacing the first pin plate in a second direction, opposite to the first direction.

Other example aspects broadly comprise a disconnect clutch with a synchronizing clutch and a locking clutch. The synchronizing clutch has a hub drivingly connected to a first shaft, a carrier drivingly connected to a second shaft, a plurality of interleaved wedge plates and friction plates, and a pin for driving connection between the plurality of wedge plates and the hub. The locking clutch has a piston for displacing the pin to lock the plurality of wedge plates directly to the hub. In some example embodiments, the pin is radially displaceable. In an example embodiment, the disconnect clutch includes a cam plate. Displacing the pin includes rotating the cam plate. In an example embodiment, the pin is axially displaceable.

Other example aspects broadly comprise a method of engaging a disconnect clutch. The method includes clamping a plurality of interleaved wedge plates and friction plates with a first piston to synchronize a rotational speed between first and second shafts, displacing a pin with a second piston, and rotating a hub to radially displace the wedge plates to lock the wedge plates to a carrier.

BRIEF DESCRIPTION OF THE DRAWINGS

The nature and mode of operation of the present invention will now be more fully described in the following detailed description taken with the accompanying drawing figures, in which:

FIG. 10A is a detail view of area 10 of FIG. 9 shown in an unlocked position;

FIG. 10B is a section view of the clutch assembly of FIG. 8 taken through a pin, shown in an unlocked position;

FIG. 11A is a detail view of area 10 of FIG. 9 shown in a locked position;

FIG. 11B is a section view of the clutch assembly of FIG. 8 taken through a pin, shown in a locked position.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
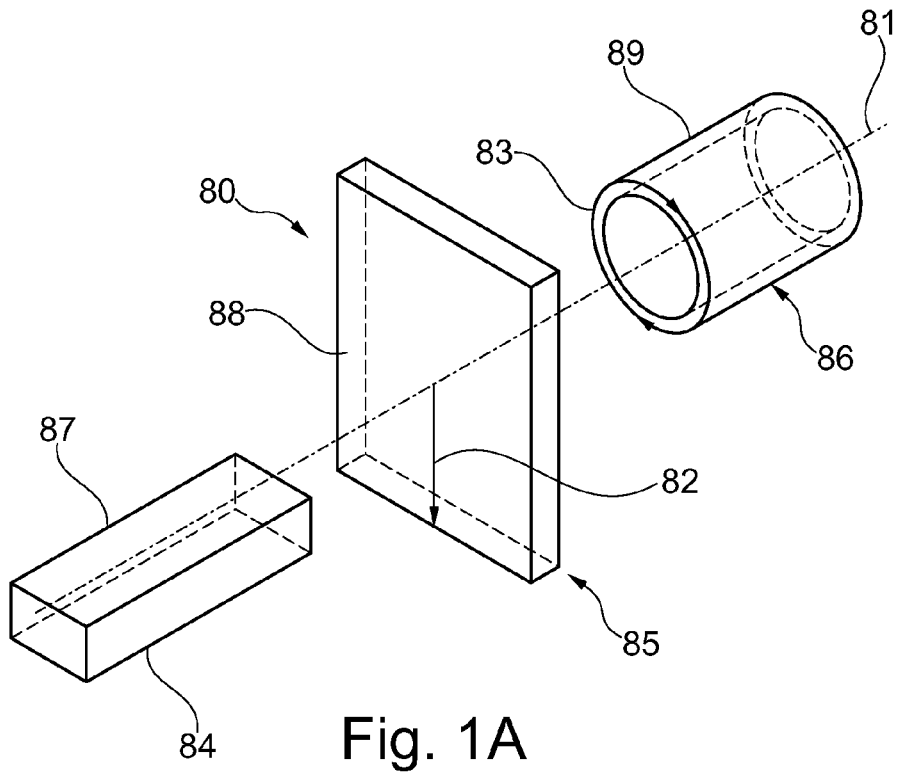
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
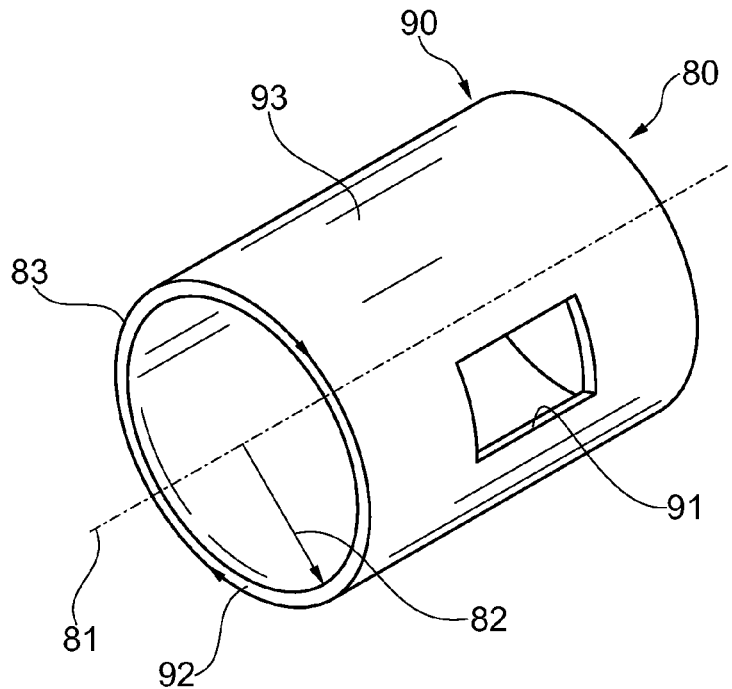
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
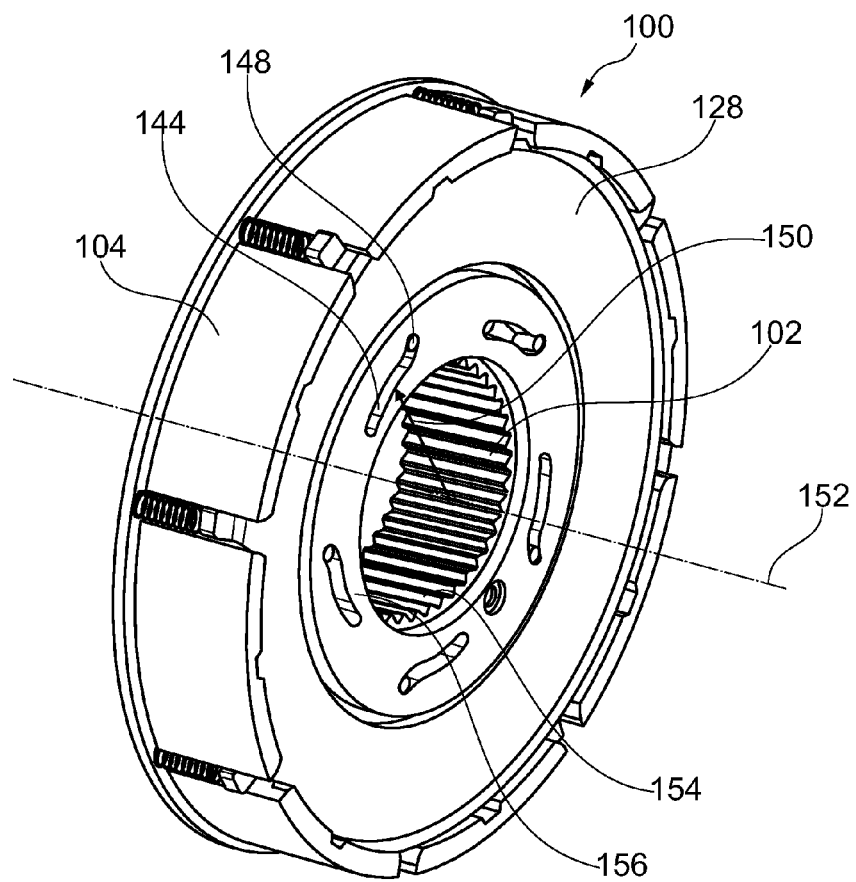
FIG. 2 is a perspective view of a locking clutch assembly with radially displaceable pins according to an example aspect.
Figure 3:
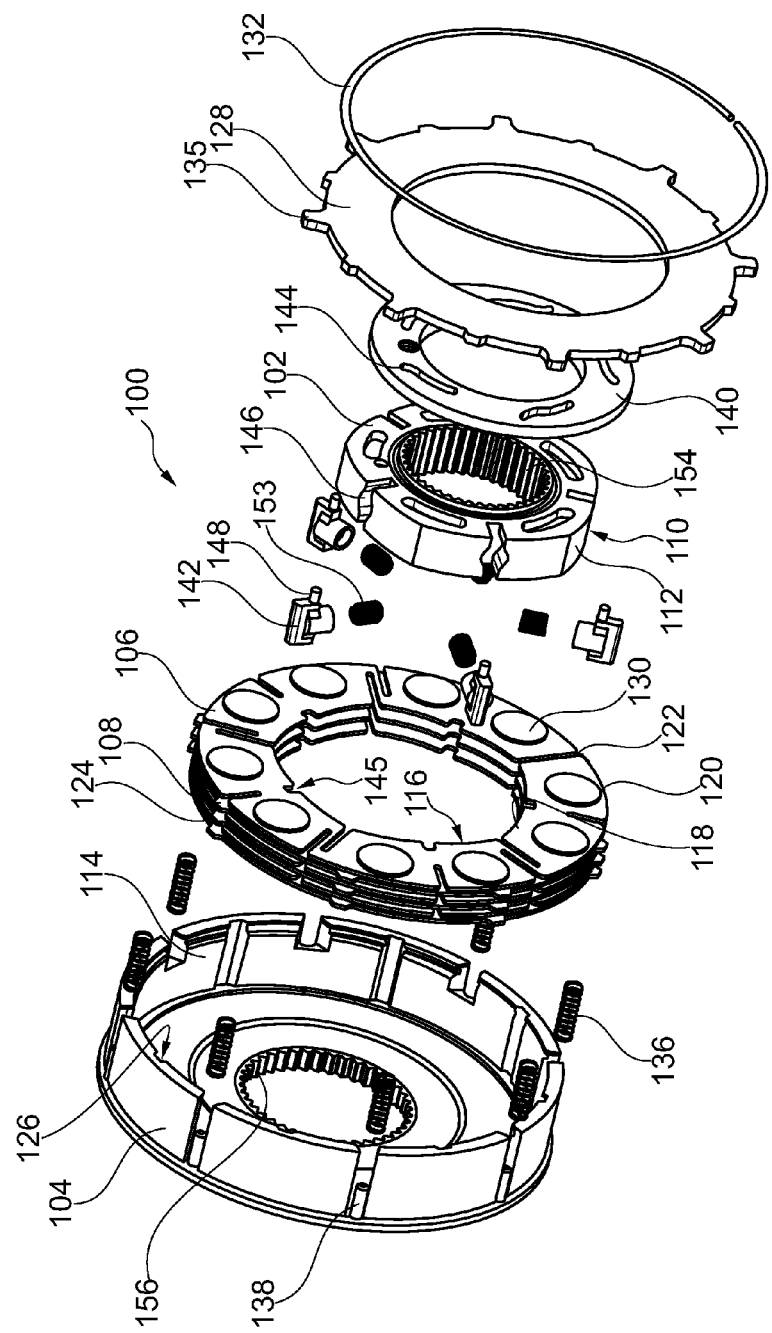
FIG. 3 is an exploded perspective view of the clutch assembly of FIG. 2.

The following description is made with reference to FIGS. 2-3. FIG. 2 is a perspective view of locking clutch assembly 100 with radially displaceable pins according to an example aspect. FIG. 3 is an exploded perspective view of clutch assembly 100 of FIG. 2. Disconnect clutch 100 includes hub 102, carrier 104, wedge plates 106, and friction plates 108. Hub 102 includes radially outer surface 110 with ramp 112. Carrier 104 includes radially inner surface 114. The wedge plate is disposed radially between the hub and the carrier.

The wedge plate includes radially inner surface 116 with ramp 118, proximate, or near, and complementary to hub outer surface 110, and radially outer surface 120 proximate, or near, carrier surface 114. Split 122 extends from inner surface 116 to outer surface 120. Friction plates 108 include radial protrusions 124 and carrier 104 includes radial indents 126. The protrusions are matingly engaged with the indents so that the friction plates are drivingly connected to the carrier. Clutch 100 includes pressure plate 128 arranged for frictionally engaging the wedge plates with the friction plates. That is, force from plate 128 acting towards carrier 104 squeezes the wedge plates and friction plates to synchronize speeds between the hub and carrier as described in more detail below. The wedge plates include friction pads 130 for improved friction performance. Pads 130 may be a wet friction material, for example. Ring 132 is fitted in groove 134 of carrier 104 to limit axial displacement of pressure plate 128, specifically radial tabs 135, caused by force of springs 136 acting on the pressure plate. Carrier 104 includes cylindrical protrusions 138 for positioning of springs 136.

Clutch 100 includes cam plate 140 and pin 142. Plate 140 is rotationally displaceable relative to the hub. That is, plate 140 and hub 102 are not rotationally fixed. Plate 140 includes slot 144. Wedge plates 106 include radial slots 145 and hub 102 includes radial slot 146. Pin 142 is disposed in slot 146. Pin 142 is arranged for limiting relative rotation between the wedge plates and the hub by radially engaging slots 145, as described in more detail below. Pin 142 includes axial protrusion 148 disposed in slot 144. Radial distance 150 of slot 144 from centerline 152 varies in a circumferential direction so that, as plate 140 is rotated relative to hub 102, protrusion 148 moves pin 142 radially inward and outward with respect to the axis. Spring 153 urges the pin in a radially outward direction to engage slot 145. Spring 153 may be a wave spring or a coil spring, for example.

Figure 4:
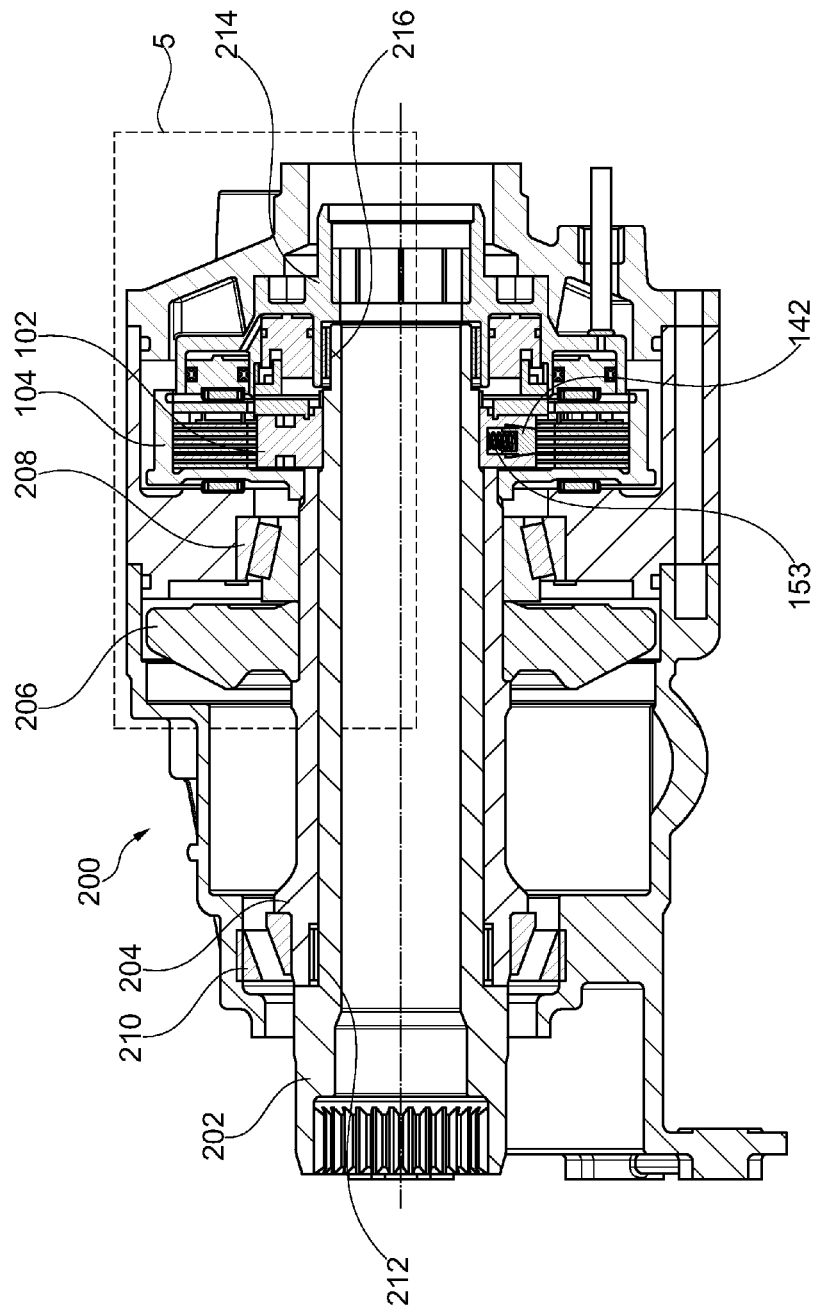
FIG. 4 is a section view of the clutch assembly of FIG. 2 shown installed in a power transfer unit.
Figure 5:
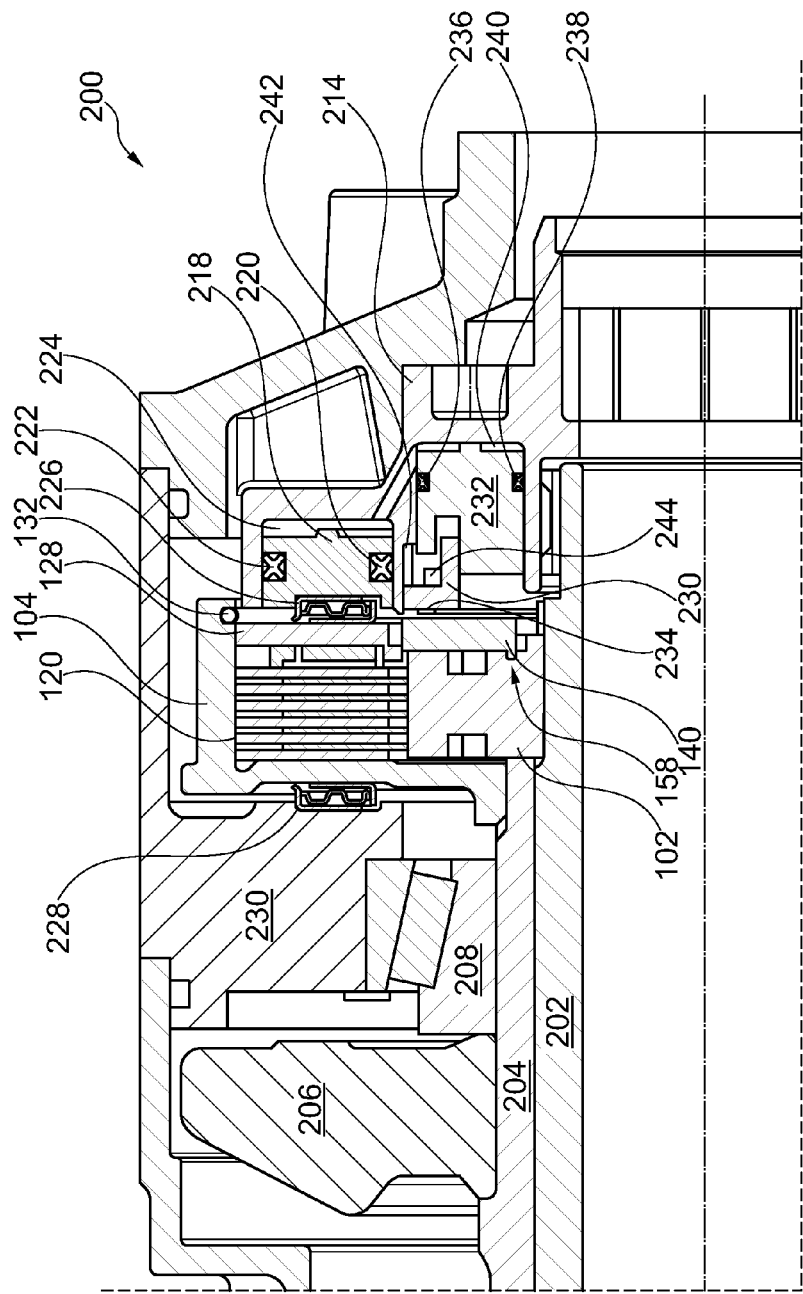
FIG. 5 is a detail view of area 5 of FIG. 4.

The following description is made with reference to FIGS. 2-5. FIG. 4 is a section view of the clutch assembly of FIG. 2 shown installed in power transfer unit (PTU) 200. FIG. 5 is a detail view of area 5 of FIG. 4. Hub 102 includes spline 154 arranged for driving connection to shaft 202 and carrier 104 includes spline 156 arranged for driving connection to shaft 204. Although shafts 202 and 204 are shown a concentric shafts, other configurations for the shafts are possible. For example, shafts 202 and 204 may extend from the hub and carrier, respectively, in axially opposite directions. PTU 200 includes gear 206 fixed to shaft 204 and bearings 208 and 210 supporting shaft 204. Shaft 202 is supported by shaft 204 through a bushing or bearing 212 and by housing segment 214 by a bushing or bearing 216.

PTU 200 includes piston 218 disposed in housing 214. Piston 218 is sealed to the housing by seals 220 and 222, creating pressure chamber 224. The piston is arranged for axially displacing the pressure plate. That is, force acting on the piston from pressure in chamber 224 is transmitted to the pressure plate through bearing 226 and is reacted back to housing segment 230 through bearing 228. Bearings 226 and 228 limit drag by allowing clutch 100 to rotate relative to housing segment 230 and piston 218. Because piston 218 need not rotate in the housing, seals 220 and 222 need not be dynamic seals and can instead be less expensive, conventional seals.

PTU 200 includes clamping plate 230 arranged to contact cam plate 140, and piston 232. Plate 230 includes friction material ring 234 for enhanced frictional performance with plate 140. Piston 232 is sealed to housing 214 by seals 236 and 238 to create pressure chamber 240. The clamping plate is rotationally fixed to the housing by spline connection 242. A force of piston 232 against plate 230 is softened by spring 244. That is, the spring provides a "cushioned" contact between the piston and the clamping plate, controlling the frictional interaction between the clamping plate and the cam plate. Spring 244 may be a wave spring, for example.

The following description is made with reference to FIGS. 2-6. FIG. 6A is a plan view of locking clutch assembly 100 of FIG. 2 shown in an unlocked position. FIG. 6B is a plan view of locking clutch assembly 100 of FIG. 2 shown in an unlocked position with pressure plate 128 and cam plate 140 removed for clarity. As can be seen in FIG. 6A, cam plate 140 is rotated relative to hub 102 in direction 156. Protrusions 148 disposed in slots 144 are displaced radially outward. That is, the protrusions are disposed in the portion of the slot with a farthest radial distance 150 from axis 152.

Figure 6A:
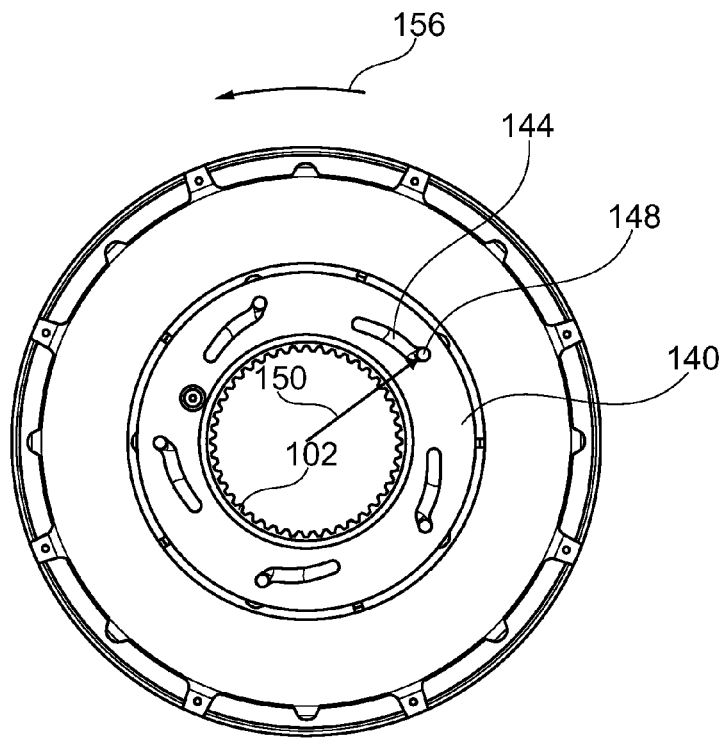
FIG. 6A is a plan view of the locking clutch assembly of FIG. 2 shown in an unlocked position.
Figure 6B:
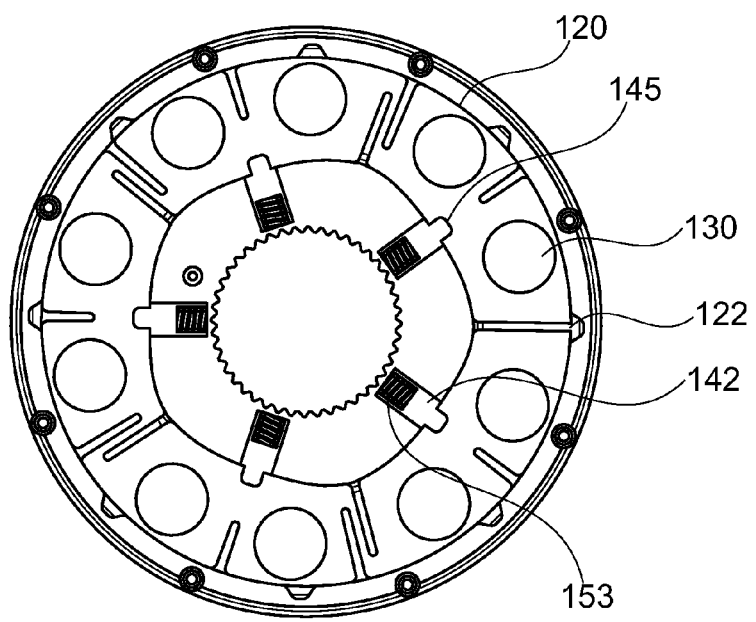
FIG. 6B is a plan view of the locking clutch assembly of FIG. 2 shown in an unlocked position with a pressure plate and a cam plate removed for clarity.
Figure 7A:
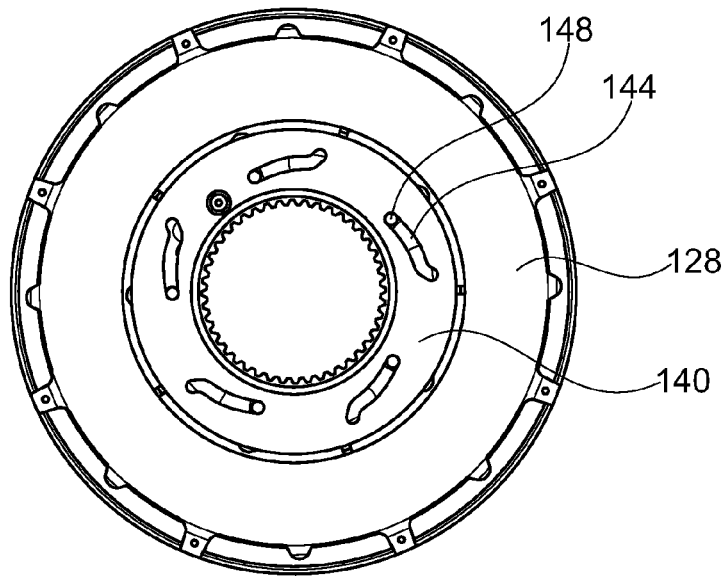
FIG. 7A is a plan view of the locking clutch assembly of FIG. 2 shown in a locked position.
Figure 7B:
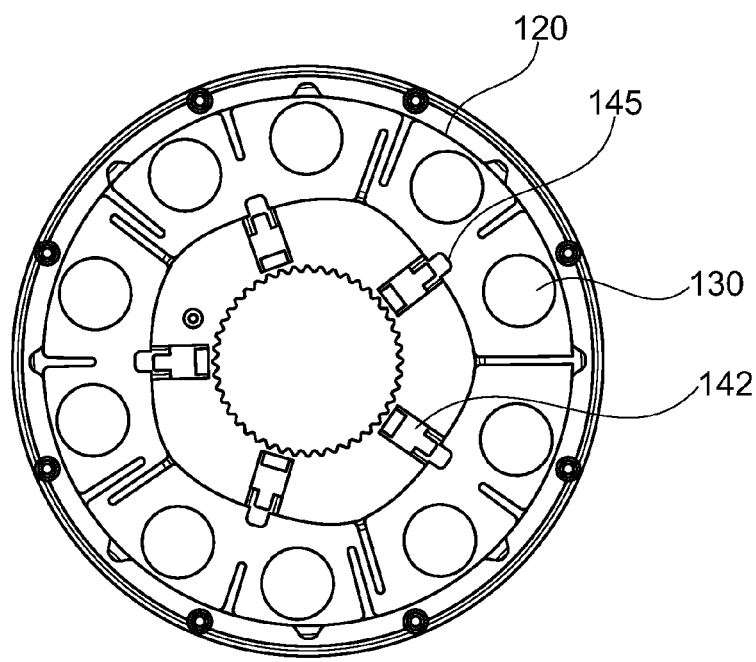
FIG. 7B is a plan view of the locking clutch assembly of FIG. 2 shown in a locked position with a pressure plate and a cam plate removed for clarity.

Turning to FIG. 6B, pins 142 are disposed in hub slots 146 and radially engaged with wedge plate slots 145, preventing the wedge plates from rotating relative to the hub. In this position, the hub and wedge plates ramps are aligned such that the wedge plates are not radially expanded. That is, the highest point of the hub ramp is aligned with the deepest point of the wedge plate ramp so that the wedge plate is at its smallest radial extent. Therefore, wedge plate outer surface 120 is freely rotatable relative to carrier inner surface 114 and torque is not transmitted through the PTU.

The following description is made with reference to FIGS. 2-7. FIG. 7A is a plan view of locking clutch assembly 100 of FIG. 2 shown in a locked position. FIG. 7B is a plan view of locking clutch assembly 100 of FIG. 2 shown in a locked position with pressure plate 128 and cam plate 140 removed for clarity. Engagement of the locking clutch is a two stage operation. During the first stage, pressure in chamber 224 moves piston 218 to clamp the wedge plates and friction plates as described above, synchronizing a rotational speed of the carrier with the hub. In this stage, torque passes from the hub to the wedge plates through the pins. That is, pins 142 are disposed in hub slots 146 and radially engaged with wedge plate slots 145 so that the pins drivingly connect the wedge plates to the hub. It should be noted that the pins are only intended to transmit a small, synchronizing torque and not the entire drive torque. The locking function, described below, transmits drive torque.

The wedge plates are drivingly connected to the carrier through the friction plates. When clamped together, torque from the wedge plates is frictionally transmitted to the friction plates through the friction pads 130. The friction plates are drivingly connected to the carrier through tabs 124. Therefore, torque from the hub is transmitted to the carrier to synchronize rotational speeds of the two components. Using a pressure to clamp the clutch pack provides a controllable engagement.

Once rotational speeds of the hub and carrier are synchronized, the second engagement stage can begin. It should be noted that, depending on the application and the need for a smooth engagement, the second phase of engagement may also begin with some difference between the rotational speeds of the hub and carrier. Pressure in chamber 240 urges piston 232 against spring 244 to engage clamping plate 230 against cam plate 140. Since plate 230 is drivingly engaged with the housing and not rotating, a rotational speed of cam plate 140 slows relative to the hub until protrusions 148 are positioned in the radially lowermost portion of cam plate slots 144. Otherwise stated, contact with the clamping plate slows rotation of the cam plate because torque from contact with the clamping plate at friction material ring 234 is greater than a driving torque from the hub to the cam plate at inner contact area 158. In this position, the pins are displaced radially inward and are no longer engaged with wedge plate slots 145.

At this stage, the wedge plates are still clamped with the friction plates and engaged with the carrier. The pin connection with the hub has been removed so the hub can rotate relative to the wedge plates. As the hub rotates, the ramps on the hub and wedge plates slide against one another, forcing the wedge plates radially outward so that the wedge plate outer surface 120 contacts the carrier inner surface 114 to lock the clutch. The radial expansion of the wedge plates is facilitated by radial slot 122.

Clutch 100 provides synchronizing and locking functions for PTU 200. In a typical installation, torque enters the PTU through shaft 202 and, when clutch 100 is engaged, exits through shaft gear 206 on shaft 204. Once pressure is removed from pistons 218 and 232, spring 253 displaces the pins radially outward and ramps on the pins rotate the wedge plates back to a rotational position where the wedge plate ramps are aligned with the hub ramps and the clutch is disengaged. At the same time, radial displacement of the pins rotates the cam plate back to its initial rotational position and the protrusions are in radially outermost portions of the slots.

Figure 8:
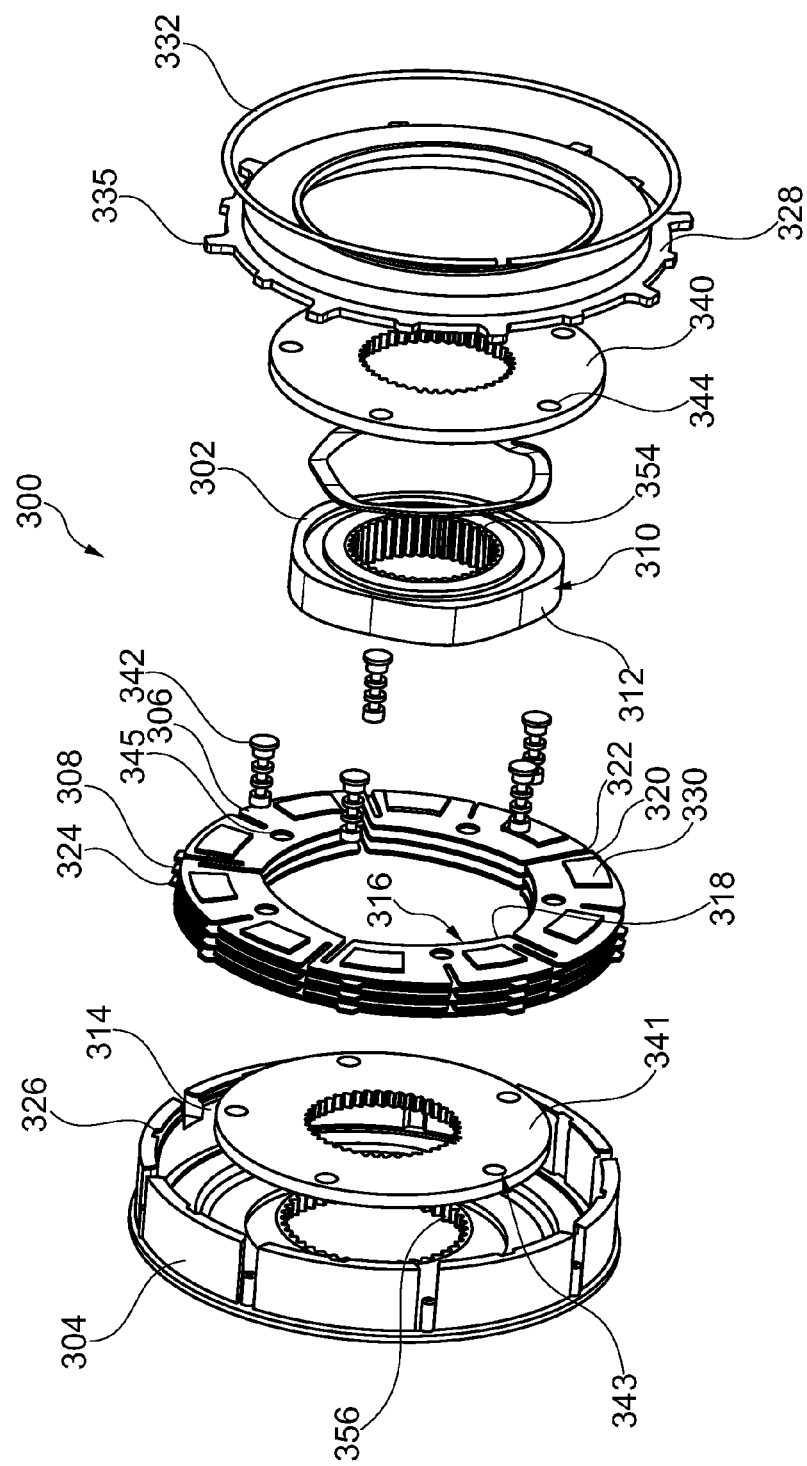
FIG. 8 is an exploded perspective view of locking clutch assembly with axially displaceable pins according to an example aspect.
Figure 8A:
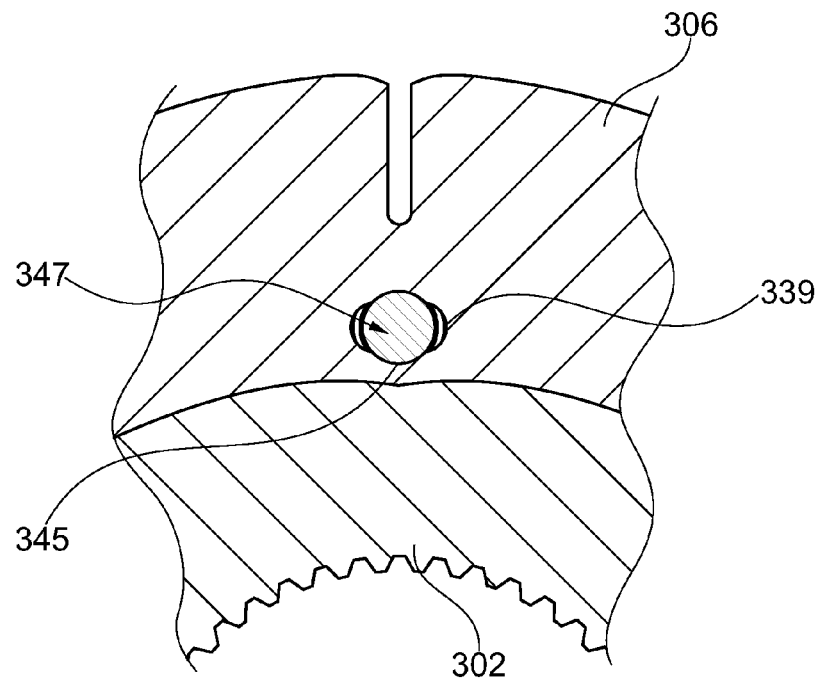
FIG. 8A is a section view of a portion of the locking clutch assembly of FIG. 8 shown in an unlocked position.
Figure 8B:
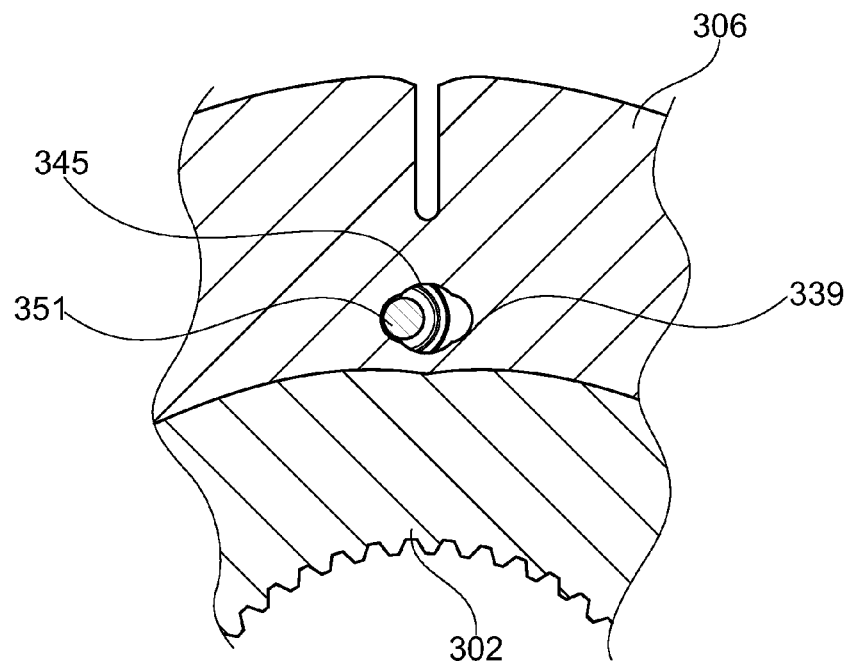
FIG. 8B is a section view of the portion of FIG. 8A shown in a locked position.
Figure 9:
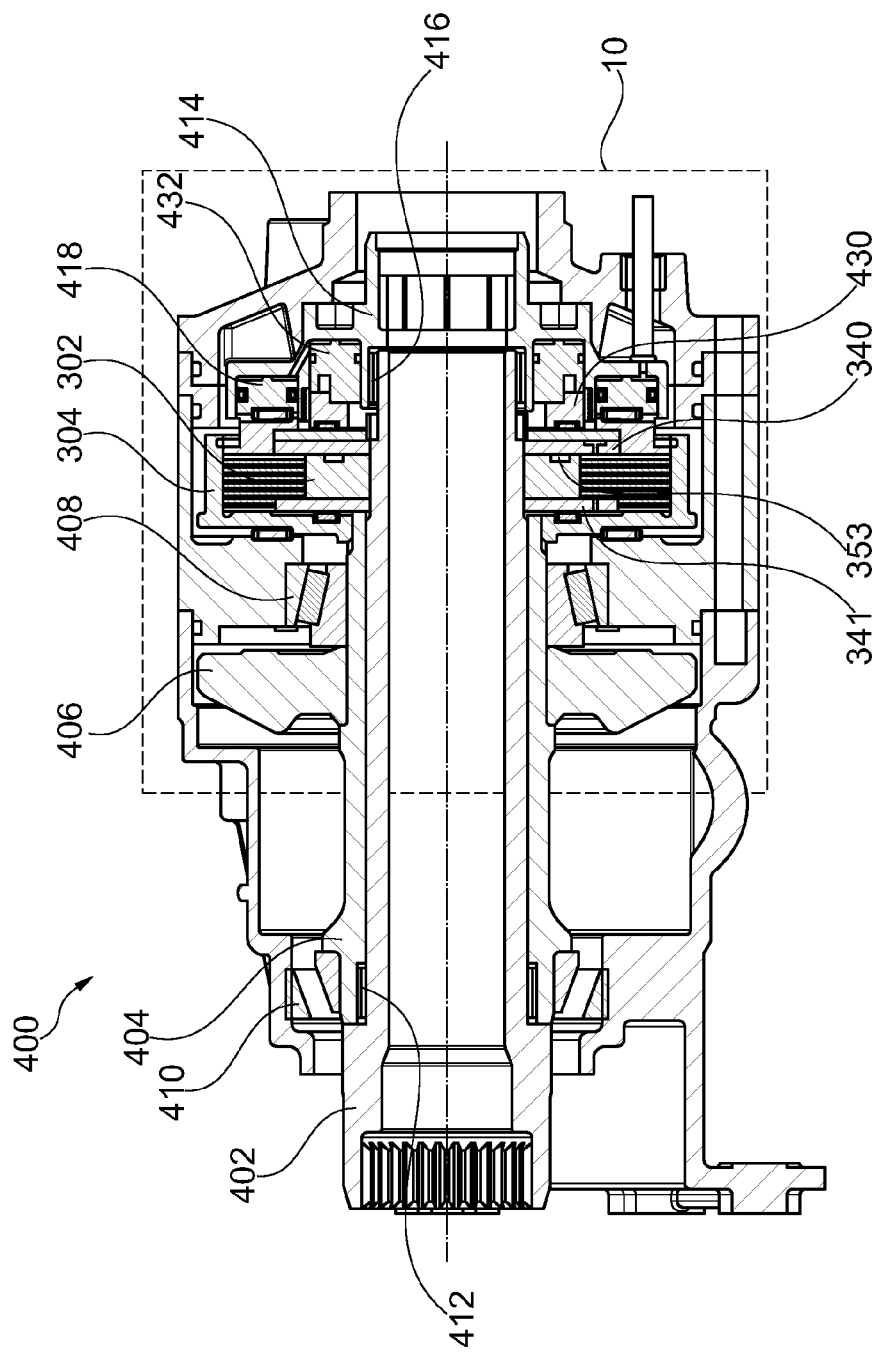
FIG. 9 is a section view of the clutch assembly of FIG. 8 shown installed in a power transfer unit.

The following description is made with reference to FIGS. 8-10. FIG. 8 is an exploded perspective view of locking clutch assembly 300 with axially displaceable pins according to an example aspect. FIG. 8A is a section view of a portion of locking clutch assembly 300 shown in an unlocked position. FIG. 8B is a section view of the portion of FIG. 8A shown in a locked position. FIG. 9 is a section view of the clutch assembly of FIG. 8 shown installed in a power transfer unit (PTU) 400. FIG. 10A is a detail view of area 10 of FIG. 9 shown in an unlocked position. FIG. 10B is a section view of the clutch assembly of FIG. 8 taken through a pin, shown in an unlocked position. Clutch 300 is comparable to clutch 100 and PTU 400 is comparable to 200, except as described below. Generally, 3XX components correspond to 1XX components and 4XX components correspond to 2XX components described above. For brevity, only the differences between the clutches and the engagement of clutch 300 will be described.

Disconnect clutch 300 includes pin 342. Wedge plate 306 includes hole 345 for receiving the pin. Although 345 is shown as a hole in clutch 300, 345 may be a radial slot extending to inner surface 316 in a manner similar to slot 145 described above. Hole 345 may include circumferential slot 339 as shown in FIGS. 8A and 8B. Pin 342 includes cylindrical portion 347 with first diameter 349, and cylindrical portion 351, axially offset from portion 347, with second diameter 355 less than diameter 349. Portion 347 fits tightly with hole 345 so that, when the pin is disposed in the hole and portion 347 is axially aligned with the wedge plate, rotational motion of the wedge plate is limited as described in more detail below.

Clutch 300 includes pin plates 340 and 341. Pin 342 is fixed to plate 340 at aperture, or hole, 344 and slidable in pin plate 341 at aperture 343. Pin 342 may be fixed to plate 340 by a process similar to riveting in which the pin is expanded into the hole, or by other means including welding or adhesives, for example. Plates 340 and 341 include splines 357 and 359, respectively, for engaging shaft 402. The plate splines rotationally fix the plates relative to hub 302 through shaft 402. That is, the plates and the hub each have splines engaged with the same shaft so they rotate in unison as the shaft is rotated.

Power transfer unit 400 includes piston 432 for axially displacing pin plate 340 in direction 446. Clutch 300 includes elastic element 353 disposed between the hub and pin plate 340 for axially displacing the pin plate in direction 448, opposite direction 446. In the example embodiment shown, element 353 is a wave spring disposed in a groove of hub 302.

The following description is made with reference to FIGS. 8-11. FIG. 11A is a detail view of area 10 of FIG. 9 shown in a locked position. FIG. 11B is a section view of the clutch assembly of FIG. 8 taken through a pin, shown in a locked position. Engagement of locking clutch 300 is similar to clutch 100 except as described below. Prior to engagement, pin 342 is axially displaced by spring 353 in direction 448 so that portion 347 is disposed in the wedge plate hole 345. The pin plates rotate with the hub and the pin is tightly fit in the wedge plate hole, so the wedge plate is not expanded by the ramp and shaft 404 is rotationally displaceable relative to shaft 402.

During synchronization, the wedge plates and friction plates are clamped by piston 418 in the same way as piston 218 clamps the plates described above. Synchronizing torque from shaft 402 is transmitted from the pin plates to the wedge plates through the pins. Unlike clutch 100 above, hub 302 does not carry synchronizing torque. During the locking phase, piston 432 presses clamping plate 430 against bearing 427 and pin plate 340, compressing spring 353 and axially displacing pins 342. Once portion 351 is axially aligned with the wedge plates, the plates are free to rotate and expand, locking the hub to the carrier as described above. Optional slots 339 (FIG. 8B) allow additional rotation of the plates. That is, a circumferential extent of slot 339 is greater than that of hole 345 such that, when reduced diameter portion 351 is aligned with the wedge plate slot, the wedge plate can rotate further than with the hole alone. The additional clearance provided by the slot may be required to ensure sufficient rotation to lock the clutch. Once pressure is removed from pistons 418 and 432, spring 353 displaces the pins in direction 448 and ramps between portions 351 and 347 rotate the wedge plates back to a rotational position where the wedge plate ramps are aligned with the hub ramps and the clutch is disengaged.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A power transfer unit comprising:
   a disconnect clutch comprising:
      a hub comprising a radially outer surface with a ramp and a first radial slot;
      a carrier comprising a radially inner surface;
      a cam plate, rotationally displaceable relative to the hub and including a second slot with a radius that varies in a circumferential direction;
      at least one wedge plate disposed radially between the hub and the carrier, comprising:
         a radially inner surface with a ramp, near and complementary to the hub outer surface;
         a radially outer surface near the carrier inner surface;
         a split extending from the radially inner surface to the radially outer surface; and,
         a third radial slot;
      at least one friction plate drivingly connected to the carrier;
      a pressure plate arranged for frictionally engaging the at least one wedge plate with the at least one friction plate;
      a pin disposed in the first radial slot and including an axial protrusion disposed in the second slot, the pin being:
         arranged to radially engage the third radial slot;
         rotationally fixed and radially displaceable with respect to the hub;
         arranged for limiting rotation of the at least one wedge plate relative to the hub; and,
         arranged to be radially displaced when the cam plate rotates relative to the hub;
   a housing;
   a first piston disposed in the housing and arranged for axially displacing the pressure plate; and,
   a clamping plate, rotationally fixed relative the housing and arranged for frictional engagement with the cam plate.

2. The disconnect clutch of claim 1 further comprising a spring urging the pin in a radially outward direction to engage the third radial slot.

3. The power transfer unit of claim 1 further comprising a second piston disposed in the housing and arranged for frictionally engaging the clamping plate with the cam plate.

4. The power transfer unit of claim 1 wherein the pin engages the third radial slot when the pin is displaced radially outward.

5. The power transfer unit of claim 1 wherein the hub includes a first spline arranged for driving connection to a first shaft and the carrier includes a second spline arranged for driving connection with a second shaft.

6. A disconnect clutch comprising:
   a hub comprising a radially outer surface with a ramp;
   a carrier comprising a radially inner surface;
   at least one wedge plate disposed radially between the hub and the carrier, comprising:
      a radially inner surface with a ramp, near and complementary to the hub outer surface;
      a radially outer surface near the carrier inner surface;
      a split extending from the radially inner surface to the radially outer surface; and,
      a slot or hole;
   at least one friction plate drivingly connected to the carrier;
   a pressure plate arranged for frictionally engaging the at least one wedge plate with the at least one friction plate; and, a pin:
- disposed in the wedge plate slot or hole;
- rotationally fixed and axially displaceable with respect to the hub; and,
- arranged for limiting rotation of the at least one wedge plate relative to the hub, the pin comprising:
  - a first cylindrical portion with a first diameter arranged for a tight fit with the wedge plate slot or hole; and,
  - a second cylindrical portion, axially offset from the first cylindrical portion, with a second diameter less than the first diameter and arranged for a loose fit with the wedge plate slot or hole.

7. The disconnect clutch of claim 6 wherein the hub includes a first spline arranged for driving connection to a first shaft and the carrier includes a second spline arranged for driving connection with a second shaft.

8. The disconnect clutch of claim 6 further comprising a first pin plate including an aperture, wherein the pin is fixed in the first pin plate aperture.

9. The disconnect clutch of claim 8 further comprising a second pin plate including an aperture, wherein the pin is axially slidable in the second pin plate aperture.

10. The disconnect clutch of claim 9 wherein the first or second pin plate is arranged to be rotationally fixed relative to the hub.

11. A power transfer unit comprising:
- the disconnect clutch of claim 8;
- a first piston for axially displacing the pressure plate in a first direction; and,
- a second piston for axially displacing the first pin plate in the first direction.

12. The power transfer unit of claim 11 wherein the disconnect clutch comprises an elastic element disposed between the hub and the first pin plate for axially displacing the first pin plate in a second direction, opposite to the first direction.

* * * * *